United States Patent [19]
Asmus

[11] 3,818,754
[45] June 25, 1974

[54] AUTOMATIC LOAD CONTROL SYSTEM FOR HYDRAULIC ROTARY POWER ABSORBERS

[75] Inventor: Carl Junior Asmus, Temple City, Calif.

[73] Assignee: Clayton Manufacturing Company, El Monte, Calif.

[22] Filed: May 4, 1972

[21] Appl. No.: 250,331

[52] U.S. Cl. .............................................. 73/134
[51] Int. Cl. ............................................ G01l 3/20
[58] Field of Search ............................ 73/117, 134

[56] References Cited
UNITED STATES PATENTS

| | | | |
|---|---|---|---|
| 2,603,968 | 7/1952 | Cline | 73/134 |
| 2,634,830 | 4/1953 | Cline | 73/134 X |
| 2,746,289 | 5/1956 | Cline | 73/117 |
| 2,785,367 | 3/1957 | Roman et al. | 73/134 X |
| 2,982,128 | 5/1961 | Gibson et al. | 73/117 |
| 3,364,736 | 1/1968 | Bathurst et al. | 73/134 |

FOREIGN PATENTS OR APPLICATIONS

| | | | |
|---|---|---|---|
| 164,994 | 1/1965 | U.S.S.R. | 73/117 |

*Primary Examiner*—Charles A. Ruehl
*Attorney, Agent, or Firm*—Jackson & Jones

[57] ABSTRACT

An automatic load control system is described for controlling the retarding force characteristics of a rotary power absorber such as a dynamometer in which the absorbed torque varies with the level of fill of the working fluid. The load control system includes a speed signal generator such as a tachometer coupled to the dynamometer for generating a speed signal representative of the rotational speed. A torque signal generator in the form of a strain gauge or other transducer is connected to the dynamometer to provide a torque signal representative of the absorbed torque. Load and unload control mechanisms such as electrically operated valves are connected between the power absorber and a source and sink for controlling the flow of working fluid into and out of the absorber and thereby the value of the absorbed torque. A flow control means controls the valves in accordance with the values of the speed and/or torque signals to thereby control the level of working fluid within the absorber to cause the absorbed torque to vary in a predetermined manner, e.g., as the square of the speed changes. An adjustable torque means is coupled to the flow control means for adjusting the absorbed torque to a selected value at a given speed. The dynamometer may also be provided with a plurality of flywheels and electrically operated means for selectively engaging one or more flywheels with the absorber rotor to simulate the inertia on an engine or vehicle under test.

37 Claims, 10 Drawing Figures

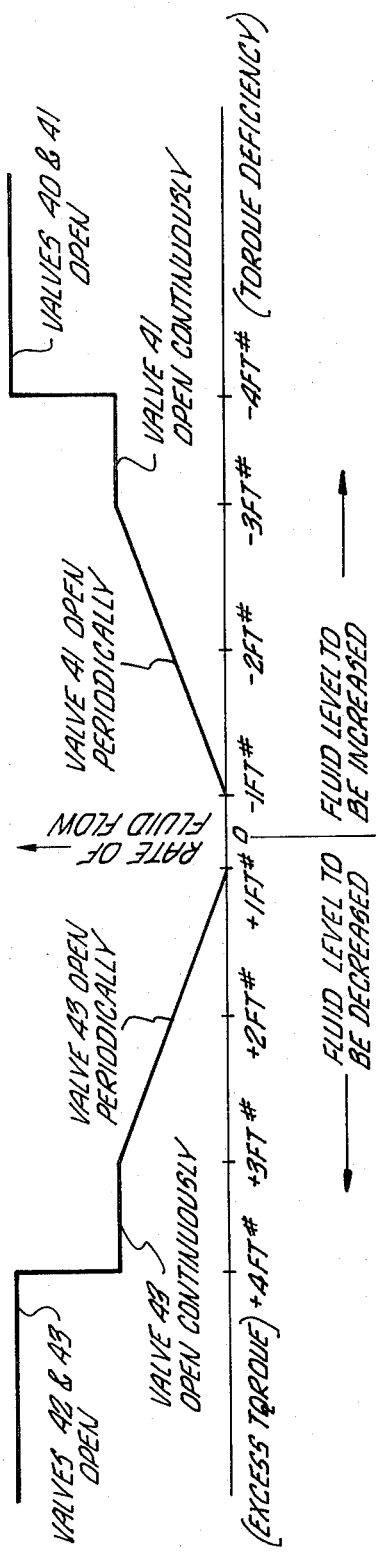
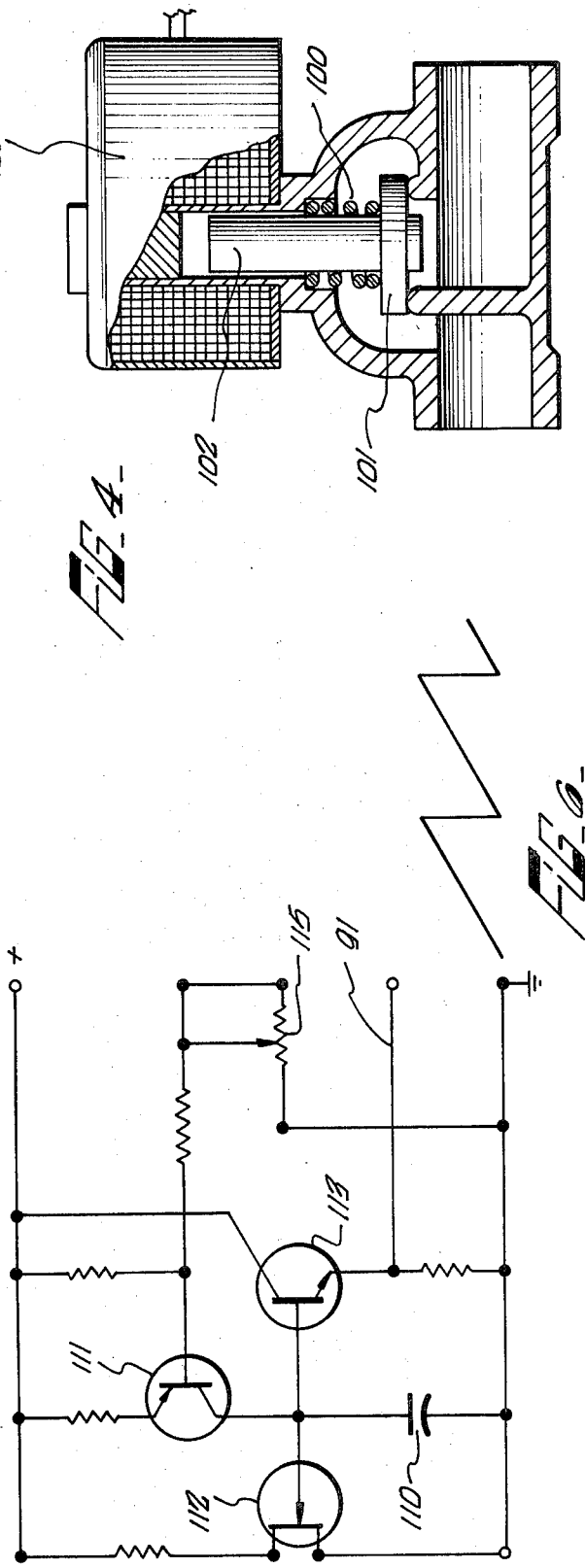

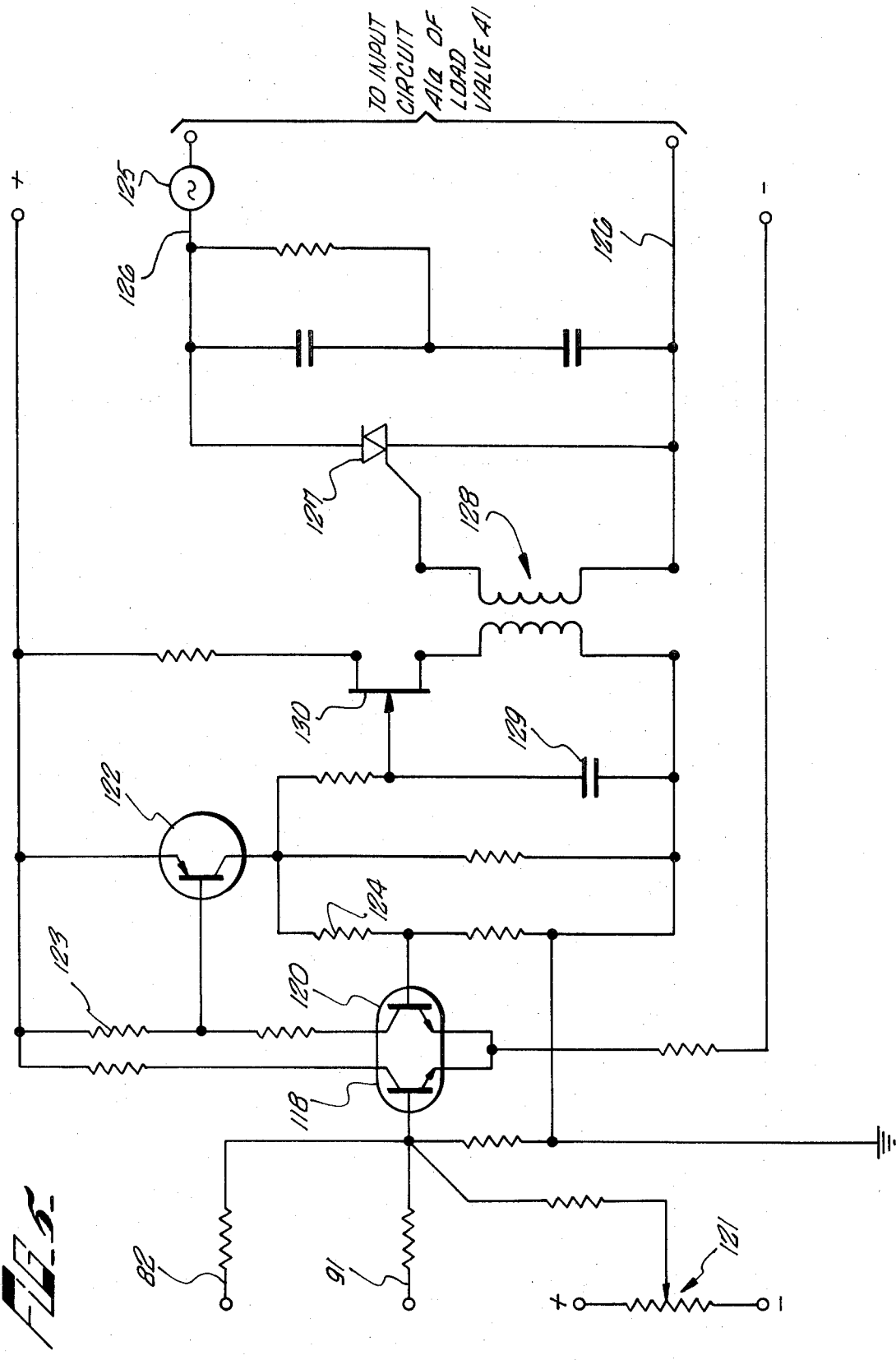

AUTOMATIC LOAD CONTROL SYSTEM FOR HYDRAULIC ROTARY POWER ABSORBERS

BACKGROUND OF THE INVENTION

1. Field of the Invention

The present invention relates to an automatic load control system and particularly to an automatic system for controlling the retarding force characteristics of a rotary power absorber.

2. Description of the Prior Art

Power absorbers such as dynamometers are used extensively for testing the under-load performance characteristics of a prime mover and particularly for detecting malfunctions or difficulties in the engine, transmission, differential, etc., of motor vehicles. Such dynamometers are particularly useful in testing motor vehicles such as automobiles under conditions simulating actual road conditions. Current legislation (Federal and many States) requires that new motor vehicles or a representative sampling thereof be tested under specified testing procedures simulating actual road conditions to determine quantitatively the emission of noxious or toxious substances from the exhaust gases, crankcase, fuel tank, etc.. For example, the U.S. Government presently requires that new motor vehicles be subjected to a twenty three minute test simulating an average trip in an urban area of 7.5 miles. In such a test the vehicle is operated on a chassis dynamometer through a specified driving schedule under idle, accelerating, decelerating, low and high road speed conditions. The emission of undesired gases or vapors such as nitric oxide, carbon monoxide and unburned hydrocarbons are quantitatively measured for the entire test as well as during the different phases thereof. In each test the engine and power train must be subjected to loads simulating actual road conditions for the particular automobile, or truck. The weight or mass of the vehicle under test may be simulated by connecting one or more flywheels to the drive roller of the dynamometer. The power required to propel a vehicle along a level road varies with vehicle weight and approximately with the third power of speed changes. Thus the torque absorbed by the dynamometer must be initially selectable to accommodate vehicles of different weights and then follow a torque curve which varies with the square of speed changes.

Emission control tests require that the dynamometer being used provide accurate and repeatable absorbed torque characteristics over wide speed ranges so that each motor vehicle will be operated under identical conditions. Several types of dynamometers are currently available, such as friction brake absorbers, eddy current brakes and hydraulic rotary power absorbers, etc..

Friction power absorbers are simple in that they employ a rotating drum or disk to be connected to the output shaft of the engine and stationary friction pads or brake shoes which are forced against the drum or disk to apply the retarding force. The retarding force or torque provided by a friction type power absorber is generally constant with respect to speed changes. The pressure or force between the stationary friction pads and the drum or disk can be varied with speed to provide nonlinear speed vs. absorbed torque curves, e.g., an exponential curve. To provide such retarding force characteristics however, requires elaborate and expensive controls or results in an unstable system or a system with a slow response time. Furthermore, if such friction power absorbers are to operate for long periods of time, for example, 15–20 minutes, then elaborate measures must be taken to control the temperature of the absorber thereby increasing the complexity, size and cost of the system.

Eddy current brakes suffer from the same type of disadvantages as friction power absorbers when used to provide speed vs. torque curves which follow a square or exponential function.

Hydraulic rotary power absorbers of the conventional type include a rotor and stator provided with vanes which direct a working fluid therebetween. Torque is absorbed by changing the momentum of the working fluid and the resulting power absorbed by the unit is converted into heat by raising the temperature of the working fluid. The heat can be dissipated by providing a heat exchanger to transfer the heat from the working fluid to an intermediate fluid such as water (closed system) or by continuously circulating working fluid through the power absorber from a source such as a city water main to a sink (open system). The load absorption capacity is dependent upon the level of the working fluid within the absorber housing. By varying the volume of working fluid within the absorber housing, a vehicle may be tested at any desired load corresponding to any road speed. The absorbed power characteristics of rotary power absorbers of the type manufactured and sold by the assignee hereof, and, for example, as described in U.S. Pat. No. 2,870,875 follow substantially a cubed curve, that is, the absorbed power varies with speed changes to the third power. Such absorbers are provided with valves for permitting the operator to change the level of working fluid within the absorber.

In using such power absorbers to conduct emission tests, it is necessary for the operator to first drive the absorber at a selected speed and then open the load or unload valves until the desired torque or horsepower is indicated on a meter for that speed. This is a time consuming operation and the torque or horsepower reading must be rechecked periodically during the tests. The accuracy of an emission control test conducted under such circumstances is dependent upon the ability and care exercised by the individual operator. Repeatability is not obtainable as a practical matter.

The above disadvantages of the prior art control systems for power absorbers are overcome by the present invention.

SUMMARY OF THE INVENTION

A load control system is provided for controlling the retarding force characteristics of a rotary power absorber in which the absorbed torque is increased and decreased by operation of load and unload control mechanisms. For example, the absorber may be of the hydraulic rotary type in which the absorbed torque varies in proportion to the level of fill of the working fluid and the control mechanisms may comprise electrically operated valves for supplying or withdrawing working fluid from the absorber.

The system includes speed signal generating means such as a tachometer coupled to the absorber for generating a speed signal representative of the rotational speed thereof. A torque signal generator is coupled to the absorber for generating a torque signal representative of the actual absorbed torque. A program signal representative of the desired torque or speed of the absorber is compared with the torque and/or speed signal to provide an error signal representative of the difference therebetween. The load or unload control mechanisms are operated in response to the error signal to vary the absorbed torque, e.g., by changing the level of fill of the working fluid and reducing the error signal. The load or unload control mechanism may be periodically turned on and off with a duty cycle which varies with the magnitude of the error signal when the error signal is between first and second predetermined values to reduce the correction in the absorbed torque or speed as the error signal approaches zero.

Where a motor vehicle is being tested, the programmed signal may be proportional to the square of the speed signal to simulate the normal road load imposed on the vehicle. One or more flywheels may also be coupled to the absorber to simulate the inertia of the engine or vehicle under test.

BRIEF DESCRIPTION OF THE DRAWING

FIG. 3 is a diagram illustrating the operation of the load and unload valves of FIG. 1;

FIG. 4 is a schematic diagram of an electrically operated load and unload valve for use in the apparatus of FIG. 1;

FIG. 5 is a schematic circuit diagram of a load driver or amplifier for use in the block diagram of FIG. 2;

FIG. 6 is a schematic circuit diagram of a pulser for use in the block diagram of FIG. 2;

FIG. 7 is a chart illustrating a group of absorbed torque vs. speed curves illustrating the performance of the absorber of FIG. 1 with varying levels of working fluid;

DESCRIPTION OF THE PREFERRED EMBODIMENT

Figure 1:
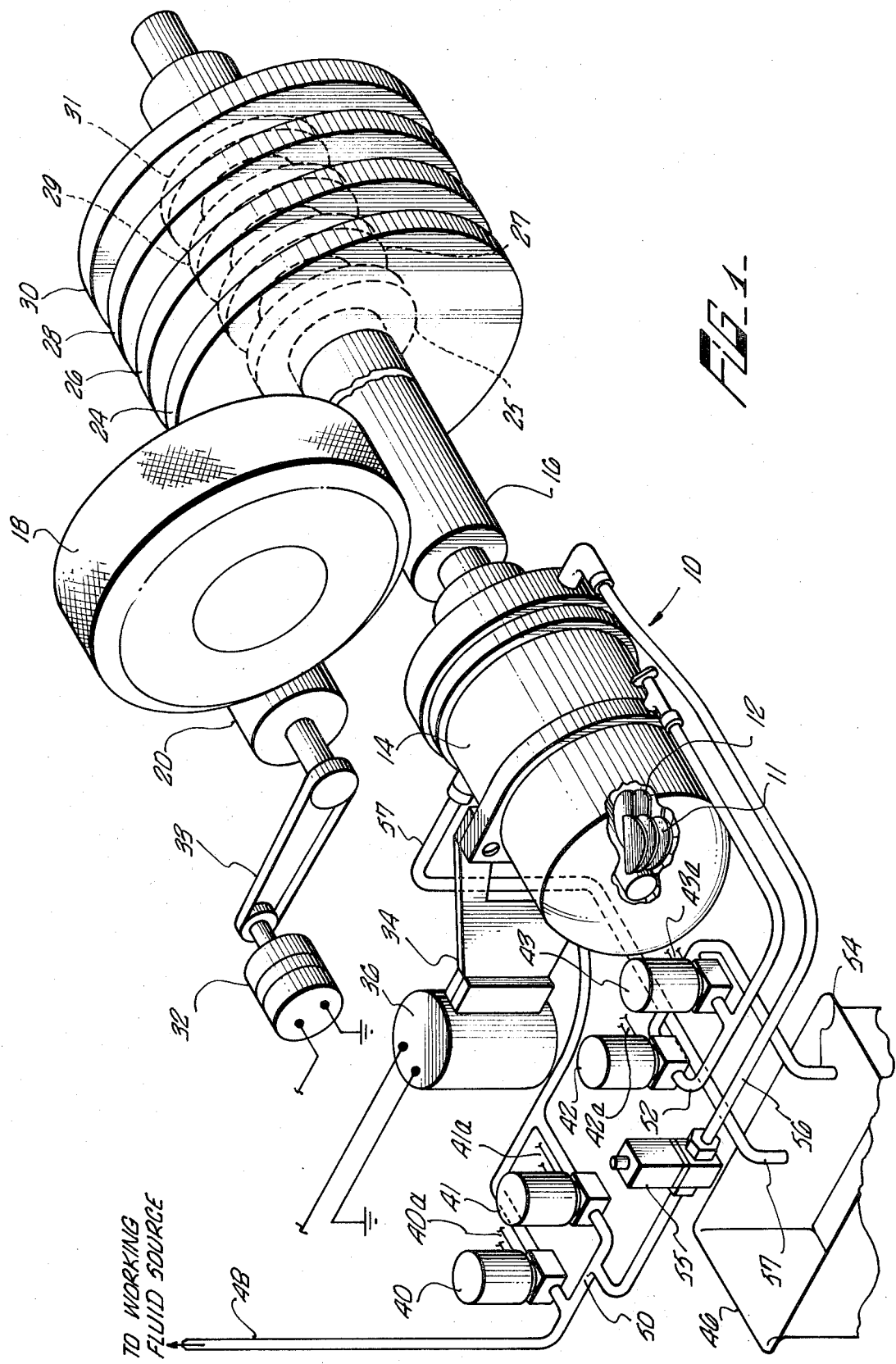
FIG. 1 is a schematic diagram of a power absorber and associated equipment in accordance with the present invention.

Referring now to FIG. 1, a rotary power absorber indicated generally at 10 includes a rotor 11, a stator 12 and a housing 14. The rotor is connected to a drive roll 16 which is driven by a suitable prime mover such as a motor vehicle engine (not shown) through the vehicle wheel 18. An idle roll 20 cooperates with the drive roll 16 to provide a treadmill type operation for absorbing the torque transmitted to the wheel 18 by the vehicle engine and power train. Flywheels 24, 26, 28 and 30 are selectively coupled to the drive roll 16 via electromagnetic clutches 25, 27, 29 and 31, respectively, as will be described in more detail. While electromagnetic clutches are illustrated, it should be noted that other types of clutches such as pneumatic, etc., could be utilized, if desired.

A speed signal generator or tachometer 32 is connected to the idle roll 20 via a flexible belt 33 to provide a d.c. output signal proportional to the rotational speed of the power absorber 10. The idle roll can rotate at a slightly different speed than the drive roll and for this reason, the tachometer may be connected to the drive roll when a more accurate speed signal is required. The absorber stator 12 and housing 14 are cradled in suitable bearings (not shown) and connected to a fixed frame through a torque arm 34 and a torque signal generator 36. The torque signal generator may be a strain gauge or other suitable transducer which provides a d.c. output signal proportional to the absorbed torque. The absorbed torque is proportional to the level of fill of the working fluid within the housing 14 of the absorber and the level of working fluid is controlled by load and unload control mechanisms such as electrically operated load valves 40 and 41 and unload valves 42 and 43. The load and unload valves are connected between the absorber housing, a source of working fluid (not shown), and a sink 46 via inlet pipe 48, inlet manifold 50, outlet manifold 52 and outlet pipe 54.

The valve 40 is referred to as a high rate load valve and valve 41 is referred to as a low rate load valve. Similarly, valves 42 and 43 are referred to as high rate and low rate unload valves. The high rate load and unload valves 40 and 42 are operated only when the difference between the absorbed or measured torque and the programmed or preselected torque is large. The low rate load and unload valves 41 and 43 are operated over a wider range of torque differences as will be explained in more detail.

The absorber 10 includes a heat exchanger (not shown) for transferring heat from the working fluid to water circulating through suitable coils within the housing. The cooling water is supplied from the working fluid source via a temperature control valve 55 and inlet and outlet conduits 56 and 57. The load and unload valves 40 through 43 are energized via input circuits 40a through 43a. The power absorber illustrated in FIG. 1 is described in more detail in U.S. Pat. No. 2,870,875. As is pointed out in the patent, the rotor carries vanes tilted at approximately a 45° angle to a plane perpendicular to the axis of rotation and the stator carries similarly positioned vanes. The working fluid is generally water. The fluid pressure within the power absorber varies over a wide range. The fill water is supplied to a low pressure region within the absorber, and the discharge water is taken from a suitable high pressure region as is described in more detail in the above patent. A portion of the circulating working fluid bypasses the stator vanes and circulates through a heat exchanger located within the housing 14. Air bleed passages are also provided to permit accurate control of the rotor load.

The absorbed torque as measured by the transducer 36 is compared with a programmed torque and the difference or error signal is utilized to operate the load and unload valves to change the fluid fill within the absorber until the error signal is reduced to substantially zero. At any given level of working fluid the torque absorbed by the power absorber 10 varies with changes in speed to the 1.80 to 1.85 power or substantially with the square of changes in speed. The change in absorbed horsepower is a function of speed and torque and therefore varies substantially with the cube of changes in speed.

Figure 2:
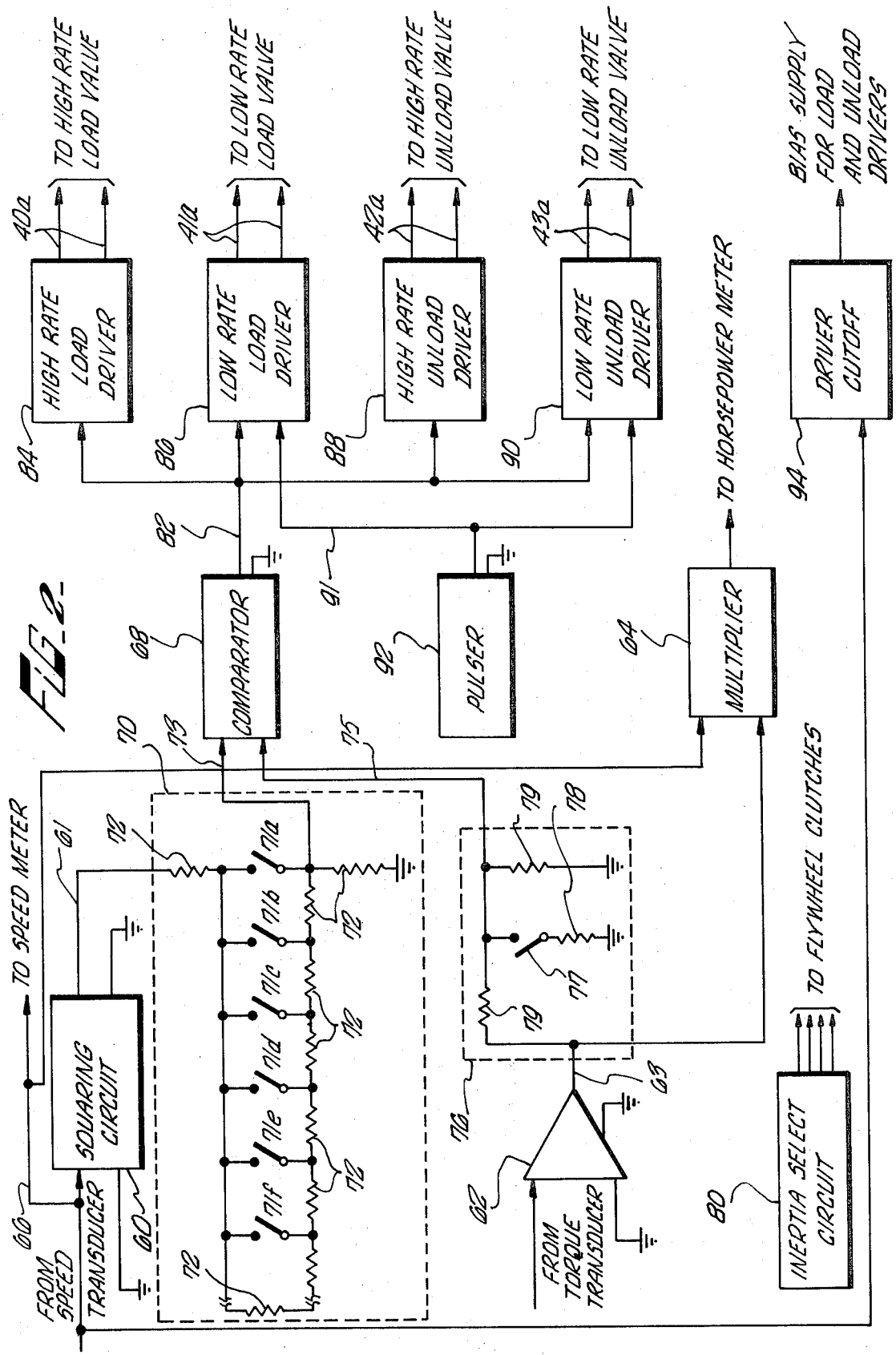
FIG. 2 is a block diagram of a load control system for the absorber disclosed in FIG. 1.
Figure 11:
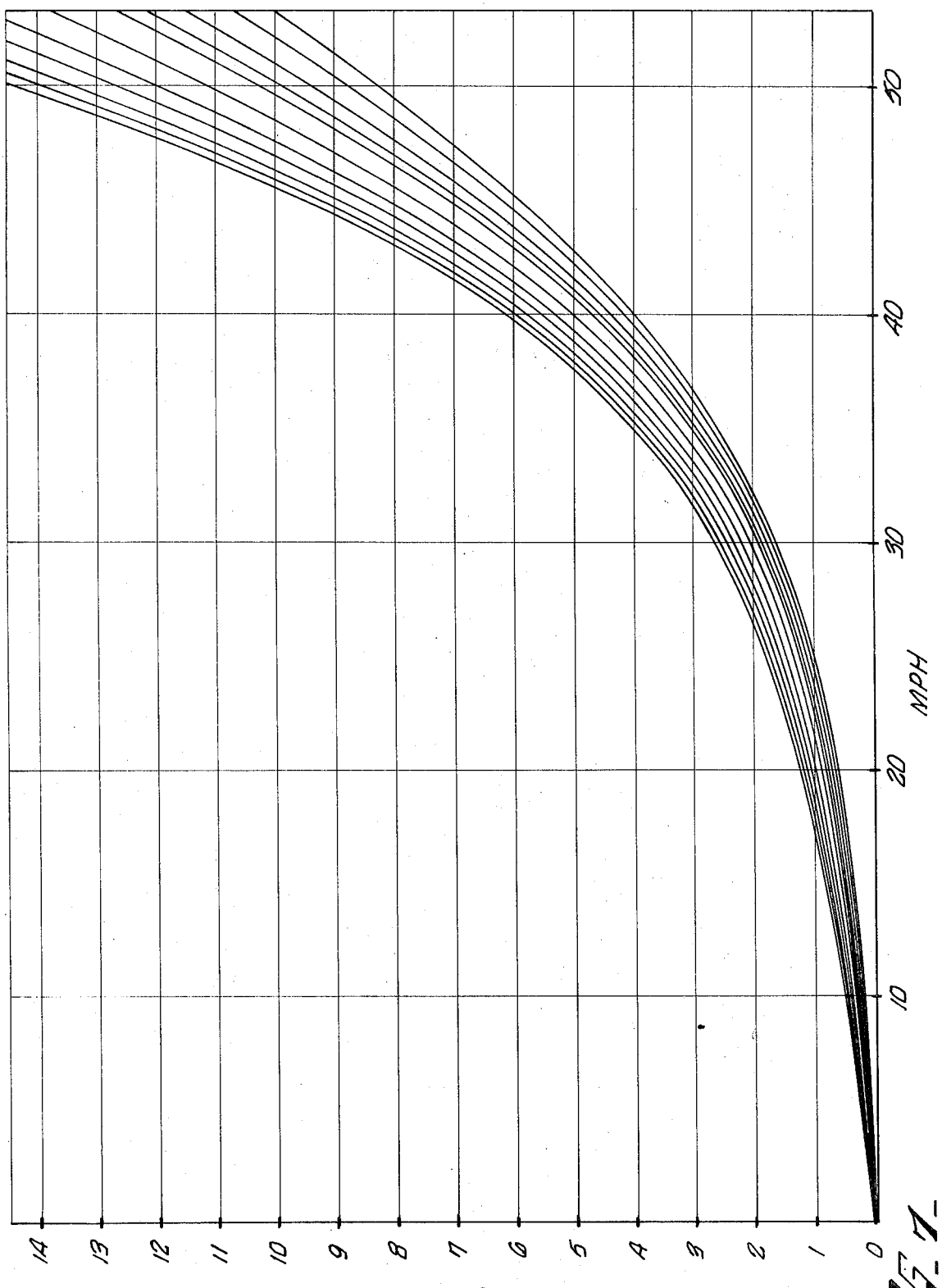

FIG. 2 is a block diagram of an electronic control system for controlling the load and unload valves in accordance with the speed and torque signals generated by the tachometer 32 and transducer 36. A squaring circuit 60 is connected to the tachometer 32 and provides an output signal in output circuit 61 which is proportional to the square of the speed signal. As an example, the output signal from the tachometer 32 may vary between 0 and −10 volts and the output signal from the squaring circuit 60 may equal the input signal squared divided by 10 to provide an output signal which varies between 0 and −10 volts. A torque signal amplifier 62 receives as its input the torque signal from the transducer 36 and provides an output signal on circuit 63 which may have a range, for example, of 0 to +10 volts. The speed and torque signals are also applied to the input circuits of a multiplier 64 which provides an output signal proportional to the torque signal multiplied by the speed signal or a signal representing the absorbed horsepower. The output signal from the multiplier 64 may be applied to a conventional volt meter to provide a visual display of the absorbed horsepower. The signal from the speed meter or tachometer can also be applied to a conventional volt meter via conductor 66 to provide a visual readout of the vehicle speed.

The output signal from the squaring circuit 60 is applied to one input 73 of a comparator 68 through a torque (or power) select circuit 70. The torque select circuit 70 includes a plurality of switches 71a through 71f connected to a resistance voltage divider network 72 for selectively varying the resistance between the output circuit 61, the input 73 and ground. The value of the resistance between the output circuit 61 and the input 73 determines the magnitude of the speed signal applied to the comparator input for any given speed of the absorber or vehicle under test. As the value of the resistance between the circuits 61 and 73 is increased via switches 71a through 71f, the signal applied to the input 73 of the comparator is decreased for a given absorber speed and vice versa. The closure of one of the switches 71a, for example, may represent 14.4 horsepower at 50 miles per hour (MPH) and the closure of switch 71f may represent 11.2 horsepower at 50 MPH. While only six switches are illustrated in the drawing, it should be noted that additional switches and resistors would normally be utilized to provide a greater number of selected horsepower ratings as will be discussed later.

The output signal from the torque amplifier 62 is applied to the other input 75 of the comparator 68 through a torque (or power) addition circuit 76. The torque addition circuit 76 includes a single switch 77 which is effective to connect a resistor 78 between the input line 75 and ground. The addition of resistor 78 to the voltage divider resistors 79 decreases the signal level at the input terminal 75 to simulate power lost in an automobile by auxiliary equipment, for example, an airconditioning unit. Thus operation of the torque addition circuit by the closure of switch 77 functions to increase the programmed torque, that is, the torque which must be supplied by the absorber for a given speed. The torque select and torque addition circuits 70 and 76 permit the operator to provide a programmed torque which simulates the road load on a motor vehicle of a given weight with or without auxiliary power equipment such as an air conditioner in operation.

An inertia select circuit 80 controls the operation of the flywheel clutches 25, 27, 29 and 31 to selectively engage the appropriate flywheels to simulate the inertia of the motor vehicle under test. For example, the dynamometer with none of the flywheels engaged may simulate an inertia load of a 2,000 pound vehicle. The flywheels 24, 26, 28 and 30 may represent additional inertial loads corresponding to vehicle weights of 250, 500, 1,000 and 2,000 pounds, respectively. Thus vehicle weights ranging from 2,000 to 5,750 pounds may be simulated by the selection and engagement of appropriate flywheels.

The signals applied to the input terminals 73 and 75 of the comparator 68 are of opposite polarity, and when the input signals have the same magnitude, the output signal on conductor 82 is zero. When the squared speed signal on input 73 has a greater magnitude than the torque signal on input 75, the output signal from the comparator is negative and vice versa. The output signal from the comparator controls the load and unload valves 40 through 43 via load and unload drivers 84, 86, 88 and 90 to vary the level of the working fluid within the absorber until the absorbed torque as measured (signal on conductor 63) has a magnitude substantially equal to the programmed torque (signal on input 73 as increased by the torque addition circuit 76 if operated). The drivers or amplifiers 84 and 88 referred to as high rate load and unload drivers, respectively, operate only when the signal on conductor 82 exceeds a preselected voltage which corresponds to a difference between the measured and programmed torque of, for example, four foot pounds. The drivers 86 and 90 are referred to as low rate load and unload drivers. The low rate drivers receive one input signal from the comparator and another input signal from a pulser 92 on conductor 91.

To prevent operation of the control system at small values of speed, a driver cutoff 94 is coupled to the speed transducer and controls the voltage bias for the load and unload drivers 84 through 90 until a predetermined speed is reached, e.g. 2 MPH.

To prevent hunting, the control system supplies or discharges working fluid from the power absorber until the difference between the measured and programmed torque reaches a first predetermined magnitude, i.e., 1 foot pound. This range may be referred to as the dead band. When the difference between the measured and programmed torque exceeds one foot pound of torque, the low rate load (or unload) driver 86 and pulser 92 function as a pulse modulation control means to supply a pulsating volting to the solenoid of the low rate load (or unload) valve. This pulsating voltage causes the valve to open and close with the duty cycle increasing in a linear manner until the difference between the measured and programmed torque equals a second predetermined value, for example, three foot pounds. When the difference between the measured and programmed torque increases beyond this second predetermined value, the low rate load (or unload) valve is held open all of the time. At a third predetermined value, for example, four foot pounds of torque difference between the measured and programmed torque, the high rate load (or unload) valve is actuated by the high rate load (or unload) driver 84 to supply (or discharge) additional working fluid to the absorber. The use of two valves for the loading and unloading operation in conjunction with the control of the flow rate as the error signal approaches zero results in a fast and stable system. The rate of flow through the load and unload valves as a function of the difference between the programmed and measured torque is illustrated in FIG. 3.

A schematic diagram of a solenoid controlled valve which may be used for the load and unload valves 40 through 43 is shown in FIG. 4. Each valve includes a spring 100 which normally biases a valve disk 101 into a closed position. The valve disk carries a magnetic armature 102 of a solenoid 103.

The load and unload driver circuits for controlling the valves 40 through 43 are almost identical and for this reason only the low rate load driver is illustrated in schematic form in FIG. 5. The pulser 92 which controls the duty cycle of the low rate load and unload valves via the driver circuits is illustrated in schematic form in FIG. 6. The schematic circuit diagrams of FIGS. 5 and 6 depict the semiconductor devices, resistors, capacitors and transformers by conventional symbols.

Referring to the pulser circuit shown in FIG. 6, an integrating capacitor 110 is charged through a current control transistor 111 until the charge reaches a predetermined level and then discharged through a unijunction transistor 112. An emitter follower transistor 113 provides a sawtooth output voltage on line 91 which follows the charge on the capacitor 110. A potentiometer 115 may be adjusted to control the rate of current flow through the transistor 111, the charging rate of the capacitor and the repetition rate of the sawtooth output pulses illustrated in FIG. 6. For example, the repetition rate of the sawtooth output signal may be adjusted between one-half to four pulses per second to accommodate the load-unload characteristics of various absorption units.

Referring now to FIG. 5, the low rate load driver includes a pair of matched transistors 118 and 120 which are connected to bias voltage sources through suitable bias resistors as shown to form a differential amplifier. A potentiometer 121 is connected between positive and negative voltage sources with the center tap connected to the base of the transistor 118 to set the input voltage response level for the amplifier. The resistors and voltage bias sources are chosen so that the transistors 118 and 120 are each conducting a nominal amount of current with a zero input signal on conductor 82 and the sawtooth output signal from the pulser 92 applied to line 91. As the sawtooth signal on conductor 91 increases from its minimum value (0 volts) to its maximum value (e.g., 9 volts), the current flow through transistor 118 increases and the current flow through transistor 120 decreases.

A control transistor 122 is connected in the circuit with its base-emitter junction in parallel with a bias resistor 123 so that the transistor 122 will conduct current only when the current flow through bias resistor 123 and through transistor 120 exceeds a preselected value. A positive feedback resistor 124 insures full current flow through the emitter collector junction of the transmitter 122 as soon as the preselected value of current through the transistor 120 is exceeded. The potentiometer 121 is adjusted so that the preselected value of current through the transistor 120 is not reached until the voltage on conductor 82 falls below a preselected value such as −0.5 volts corresponding to an error signal representative of −1 foot pound of torque, e.g., the measured torque is 1 foot pound less than the programmed torque. The sawtooth signal on conductor 91 serves to reduce the current flow through transistor 120 below said preselected value for a portion of each pulse of the sawtooth signal when the error signal on conductor 82 represents a torque deficiency between one and three foot pounds. When the error signal on conductor 82 represents a torque deficiency of 2 foot pounds, the transistor 122 will conduct current only during one-half of each cycle of the sawtooth signal on conductor 91, that is, during the time that the signal on conductor 91 goes zero to one-half of its maximum value, say 4.5 volts. In this manner the pulser 92 controls the ratio of the "on" to "off" time of the transistor 122 in direct proportion to the magnitude of the torque deficiency within a selected range. When the torque deficiency is above this range, e.g., 3 foot pounds, then the transistor 122 conducts current continuously and the load valve 41 is held open.

The input circuit 41a to the solenoid winding on low rate load valve 41 is connected in series with a source of a.c. voltage 125, i.e., 110 volts at 60 cycles, and the output circuit 126 of the driver of FIG. 5. The a.c. source 125 (not normally included in the driver 86) is switched across the solenoid winding of the valve 41 by a gate controlled semiconductor switch 127. The switch 127 is supplied trigger pulses by a trigger transformer 128. The trigger pulses are generated by the discharge current of an integrating capacitor 129 through a unijunction transistor 130. The capacitor 129 is charged via transistor 122 and is periodically discharged through the unijunction transistor 129 at a high rate relative to the frequency of the a.c., source 125, for example, at 1,200 $H_z$ (cycles per second). Once the semiconductor switch 127 is turned on by a pulse from the trigger transformer 128, it provides a very low impedance to the current flow through the solenoid winding of the valve 41 until the a.c. voltage from the source 125 changes phase. When the a.c. voltage changes phase, the switch 127 is turned off and remains off until it receives an additional trigger pulse from the transformer 128. Thus as long as the transistor 122 is conducting current, the switch 127 is turned on during at least 90 percent of each half cycle of the voltage from source 125. The solenoid valve does not respond to the brief interval that switch 127 is open circuited during each half cycle and therefore the solenoid valve remains open as long as the transistor 122 is conducting current.

The high rate load driver 84, FIG. 2, is identical to the load driver shown in FIG. 5 with the exception that there is no connection to a pulser circuit and the potentiometer 121 is adjusted to maintain the transistor 122 off until the comparator output signal on conductor 82 exceeds a predetermined value corresponding, for example, to a torque deficiency of four foot pounds as illustrated in FIG. 3.

The low rate unload driver 90, FIG. 2, is identical to the driver depicted in FIG. 5 with the exception that the output of the comparator on conductor 82 is connected through a resistor to the base of the transistor 120. In this configuration, the potentiometer 121 is again set so that the transistor 122 remains off until the signal on line 82 exceeds a preselected value, for example, +0.5 volts representing an excessive torque of one foot pound. A signal applied to the base of a transistor 120 which is greater than this value will turn the transistor 122 on for a portion or all of each cycle of the sawtooth output from the pulser 92 as has been discussed in connection with the operation of the driver of FIG. 5.

The high rate unload driver 88 is identical to the low rate unload driver with the exception that no pulser is connected to the circuit and the potentiometer 121 is adjusted to provide a wider dead band as illustrated in FIG. 3.

The power absorbed by unit 10 with a constant level of working fluid follows substantially a cubed curve, that is, a curve in which the power varies substantially as the cube of the speed. This type of loading closely simulates the steady state load imposed on a motor vehicle traveling on a level road. A family of such power curves are illustrated in FIG. 7. The corresponding absorbed torque curves follow substantially a square function.

The following table illustrates a selection of horsepower curves and vehicle inertia loads for eleven vehicle classes in accordance with existing U.S. Government emission control testing standards.

| Vehicle Class Code | Inertia Equivalent Vehicle Weight in Pounds | Absorbed Horsepower at 50 MPH |
| --- | --- | --- |
| 1 | 2000 | 8.3 |
| 2 | 2250 | 8.8 |
| 3 | 2500 | 9.4 |
| 4 | 2750 | 9.9 |
| 5 | 3000 | 10.3 |
| 6 | 3500 | 11.2 |
| 7 | 4000 | 12.0 |
| 8 | 4500 | 12.7 |
| 9 | 5000 | 13.4 |
| 10 | 5500 | 13.9 |
| 11 | 5500 | 14.4 |

AIR CONDITIONING FACTOR

With Air Conditioning Add 10% to Absorbed Horsepower

Figure 8:
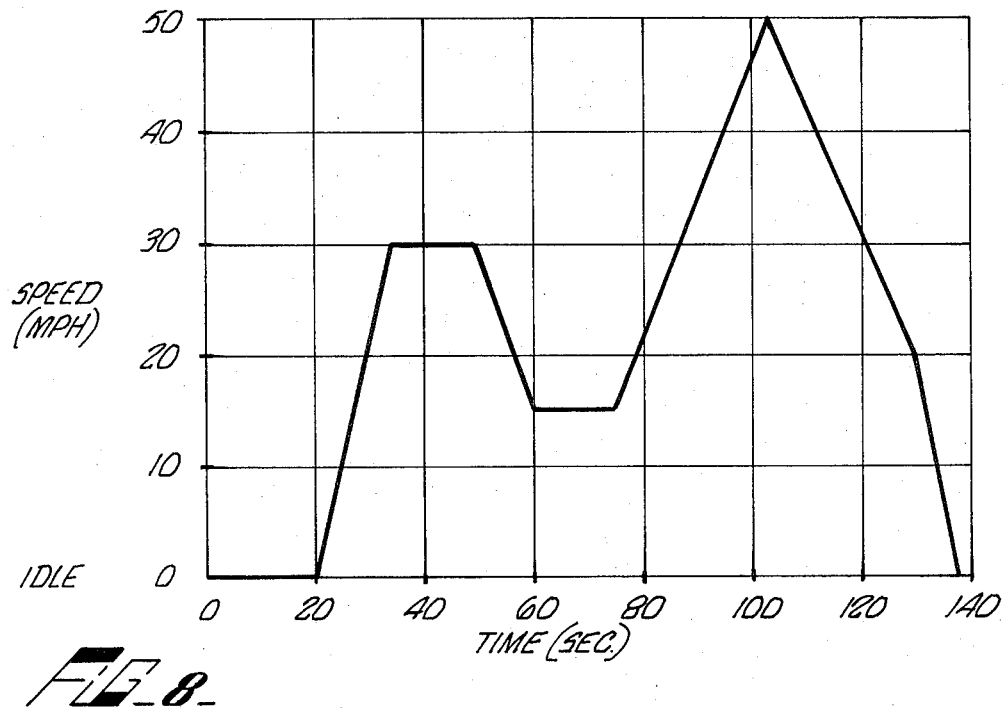
FIG. 8 is a curve illustrating a typical emission cycle.

FIG. 8 illustrates a simple emission testing procedure in which only seven testing modes requiring an elapsed time of slightly over 2 minutes are used. To test a motor vehicle to determine whether it meets specified emission control standards or to determine faulty or malfunctioning parts, it is only necessary to back the vehicle onto a chassis type dynamometer, as illustrated in FIG. 1, so that the rear wheels are cradled between the drive and idle rolls 16 and 20. Suitable chocks may be placed in front of the front wheels as a safety precaution, if desired. A suitable gas analyzer for providing a quantitative measurement of unburned hydro-carbon vapor, carbon monoxide, nitric oxide and other gases, if desired, is connected to the exhaust tubing of the vehicle. If desired, additional instruments may also be employed to determine gas emission from the crankcase, gas tank, etc., or for measuring engine performance characteristics. The appropriate power selection switch 71a through 71f is closed to provide the proper programmed torque (or power) for the motor vehicle under test. For example, if the motor vehicle weighs 3,000 lbs. and the above chart is being used, then a curve providing an absorbed horsepower of 10.3 at 50 MPH would be selected. The inertia select circuit 80 is also operated, for example, by means of appropriate switches to engage the flywheel 28 to provide an equivalent vehicle inertia of 3,000 pounds. If the vehicle contains an air conditioning unit, then switch 77 of the torque addition circuit 76 is also closed.

The vehicle engine is then started in a conventional manner and operated at the desired speed, acceleration and deceleration schedules in accordance with an appropriate testing procedure, for example, like the one shown in FIG. 8. The gas analysis instrument will provide a measurement of the quantity of the monitored gases which were emitted during the testing procedure as well as the separate phases thereof.

Figure 9:
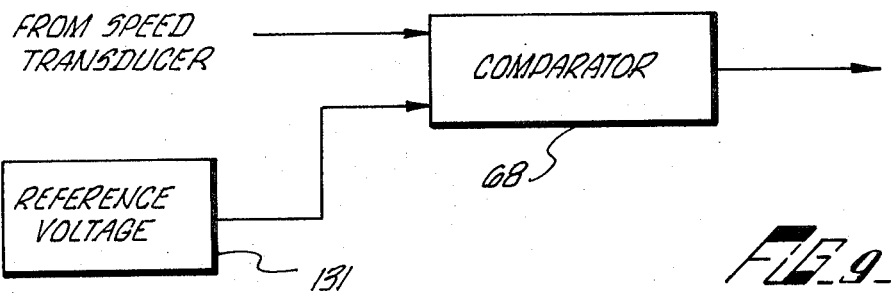
FIG. 9 is a block diagram of a modification of the control system of FIG. 2 to provide constant speed operation.

If the motor vehicle is to be tested for detection of malfunctioning parts of the engine or power train, then the programmed torque may be set to simulate uphill or downhill driving loads at various speeds as well as level driving loads. If desired, the control system of FIG. 2 may be modified to provide a constant or variable speed operation independent of the absorbed torque by applying a steady state or variable reference voltage from source 131 to one input of the comparator 68 and a speed signal from the tachometer 32 to the other input as is illustrated in FIG. 9.

Figure 10:
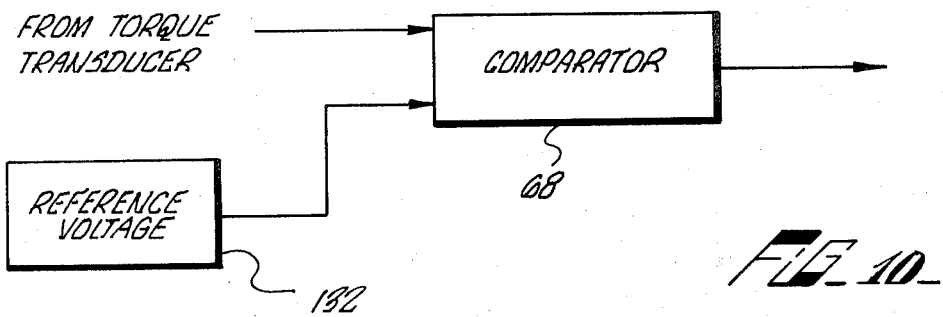
FIG. 10 is a block diagram of an additional modification of the control system of FIG. 2 to provide an absorbed torque independent of speed.

In FIG. 10, the programmed torque is applied to one input of the comparator from a reference voltage source 132 and the measured torque is applied to the other input of the comparator. The absorbed torque will then follow the reference voltage 132 independent of speed.

The power absorber 10 of FIG. 1 utilizes a closed working fluid system and removes absorbed energy from the unit by the circulation of cooling water through a heat exchanger located within the unit. If desired, the heat exchanger may be dispensed with by allowing working fluid or water to continuously circulate through the power absorber housing, for example, by permitting water to continuously circulate through the power absorber housing via discharge pipe 57. The control system will then offset the discharge water by continually adding water to the housing through the load valves in response to the error torque signal.

I have described an automatic load control system for rotary power absorbers which permits an operator to initially select the proper torque and inertia load for a motor vehicle of any given weight to simulate the load imposed on the vehicle at all speeds on a level road. Since the power absorber described in U.S. Pat. No. 2,870,875 provides an absorbed torque which varies in the same manner as the torque imposed by a level road, that is, as the square of speed changes the load and unload valves will be operated only seldom if at all during an entire emission testing procedure.

It should be noted that while the power absorbed has been illustrated in chassis dynamometer configuration, it can be used to test engines which are not mounted in motor vehicles, e.g., by coupling the rotor 12 directly to the engine crankshaft.

Various modifications of the control system will be apparent to those skilled in the art without involving any departure from the scope of my invention as defined in the following claims.

What is claimed is:

1. In a load control system for controlling the retarding force characteristics of a hydraulic rotary power absorber in which the absorbed torque varies in proportion to the level of fill of the working fluid, the combination which comprises:

speed signal generating means for generating a signal representative of the rotational speed of the power absorber;

torque signal generating means for generating a signal representative of the torque absorbed by the power absorber; and flow control means connected to the power absorber and adapted to be connected to a source of working fluid and responsive to said speed and torque signals for controlling the level of working fluid within the absorber to vary the absorbed torque in a predetermined manner in accordance with the speed and torque of the absorber.

2. The combination as defined in claim 1 wherein the flow control means is responsive to the speed signal squared and the torque signal to provide an absorbed torque which varies substantially with the square of speed changes.

3. In a load control system for controlling the retarding force characteristics of a hydraulic rotary power absorber in which the absorbed torque varies in proportion to the level of fill of the working fluid, the combination which comprises:

speed signal generating means for generating a signal representative of the rotational speed of the power absorber;

torque signal generating means for generating a signal representative of the torque absorbed by the power absorber; and flow control means connected to the power absorber and adapted to be connected to a source of working fluid and responsive to at least one of said speed and torque signals for controlling the level of working fluid within the absorber and the rate of flow of working fluid into or out of the absorber in accordance with the magnitude of the difference between the actual and desired values of speed and/or torque of the absorber.

4. The combination as defined in claim 3 wherein the flow control means includes electrically operated load and unload valves for controlling the fill and withdrawal of working fluid from the absorber and wherein the load and unload valves are arranged to open and close completely and the flow control means controls the duty cycle of the load and unload valves to provide a lower duty cycle as the value of the speed and/or torque approaches the desired value.

5. The combination as defined in claim 3 wherein the flow control means is responsive to the difference between the torque signal and the square of the speed signal to cause the absorbed power to follow a cubed function.

6. The combination as defined in claim 3 wherein the flow control means is responsive to the difference between the speed signal and a selected reference signal to cause the absorber to operate at a substantially constant speed.

7. The combination as defined in claim 3 wherein the flow control means is responsive to the difference between the torque signal and a selected reference signal to cause the absorber to operate at a substantially constant torque.

8. In a load control system for controlling the retarding force characteristics of a hydraulic rotary power absorber in which the absorbed torque varies in proportion to the level of fill of the working fluid, the combination which comprises:

speed signal generating means for generating a signal representative of the rotational speed of the power absorber;

torque signal generating means for generating a signal representative of the torque absorbed by the power absorber; and flow control means including at least one electrically operated load valve connected between the absorber and a source of working fluid for controlling the fill of the absorber and one electrically operated unload valve connected to the absorber for controlling the withdrawal of fluid from the absorber, the flow control means being responsive to the torque signal and the square of the speed for controlling the level of working fluid within the absorber to cause the absorbed torque to follow a cubed function.

9. In a load control system for controlling the retarding force characteristics of a hydraulic rotary power absorber in which the absorbed torque varies in proportion to the level of fill of the working fluid, the combination which comprises:

speed signal generating means for generating a signal representative of the rotational speed of the power absorber;

means for generating a selected reference signal; and flow control means including at least one electrically operated load valve connected between the absorber and a source of working fluid for controlling the fill of the absorber and one electrically operated unload valve connected to the absorber for controlling the withdrawal of fluid from the absorber, the flow control means being responsive to the difference between the speed signal and the reference signal to cause the absorber to operate at a substantially constant speed.

10. In a load control system for controlling the retarding force characteristics of a hydraulic rotary power absorber in which the absorbed torque varies in proportion to the level of fill of the working fluid, the combination which comprises:

torque signal generating means for generating a signal representative of the torque absorbed by the power absorber;

means for generating a selected reference signal; and flow control means including at least one electrically operated load valve connected between the absorber and a source of working fluid for controlling the fill of the absorber and one electrically operated unload valve connected to the absorber for controlling the withdrawal of fluid from the absorber, the flow control means being responsive to the difference between the torque signal and the reference signal for controlling the level of working fluid within the absorber to cause the absorber to operate at a substantially constant torque.

11. In a load control system for controlling the retarding force characteristics of a hydraulic rotary power absorber in which the absorbed torque varies in proportion to the level of fill of the working fluid within the absorber and changes substantially with the square of speed changes with a given fill, the working fluid being supplied from a source and discharged into a sink, the combination which comprises:

speed signal generating means coupled to the absorber for generating a speed signal representative of the rotational speed thereof;

torque signal generating means coupled to the absorber for generating a torque signal representative of the absorbed torque;

flow control means connected between the power absorber, the source and the sink and responsive to the speed and torque signals for controlling the level of working fluid within the absorber to cause the absorbed torque to vary substantially as the square of the speed of the absorber; and a power select means coupled to the flow control means for adjusting the absorbed torque to a selected value at a given speed.

12. The combination as defined in claim 11 wherein the flow control means includes comparator means for comparing the torque signal with the square of the speed signal.

13. The combination as defined in claim 12 wherein the flow control means further includes at least one electrically operated load valve connected between the source of working fluid and the absorber for controlling the fill of the absorber and at least one electrically operated unload valve connected between the sink and the absorber for controlling the withdrawal of fluid from the absorber.

14. The combination as defined in claim 13 including means responsive to the speed signal for maintaining the load and unload valves closed when the speed of the absorber is below a predetermined value.

15. The combination as defined in claim 13 wherein the flow control means further includes rate control means for controlling the rate of flow through the load and unload valves in accordance with the magnitude of the difference between the torque and the squared speed signal.

16. The combination as defined in claim 15 wherein the flow control means further includes a second electrically operating load valve connected between the source and the absorber and a second electrically operated unload valve connected between the sink and the absorber.

17. The combination as defined in claim 16 wherein the flow control means opens the second load and unload valves only when the magnitude of the difference between the torque and squared speed signals exceeds a predetermined value.

18. The combination as defined in claim 17 wherein the load and unload valves are arranged to open or close completely and wherein the rate control means controls the duty cycle of the first load and unload valves to provide a linearly decreasing duty cycle as the value of the torque signal approaches the squared speed signal.

19. In a dynamometer system for imposing a load on an engine or motor vehicle which simulates operating or normal driving conditions, the combination which comprises:

a hydraulic rotary power absorber arranged to provide an absorbed torque which varies in proportion to the level of fill of the working fluid therein and which changes substantially with the square of speed changes with a given fill;

a plurality of flywheels;

means for selectively coupling one or more of the flywheels to the absorber to simulate the inertia of the engine or vehicle under test;

speed signal generating means coupled to the absorber for generating a speed signal representative of the rotational speed thereof;

torque signal generating means coupled to the absorber for generating a torque signal representative of the absorbed torque;

power select means responsive to at least one of said speed and torque signals for providing a programmed torque output signal representative of the desired absorbed torque over a range of operating conditions;

means for comparing the programmed torque signal and the absorbed torque signal and for providing an error signal representative of the difference therebetween; and flow control means connected to the power absorber and adapted to be connected to a source and sink of the working fluid and responsive to the error signal for controlling the level of working fluid within the absorber to reduce the error signal.

20. The combination as defined by claim 19 wherein the power select means is responsive to the speed signal squared for providing a programmed torque signal which varies as the square of the rotational speed of the absorber.

21. The combination as defined by claim 20 wherein the flow control means includes at least one electrically operated load valve connected to the absorber and adapted to be connected to the source for controlling the flow of fluid into the absorber and at least one electrically operated unload valve connected to the power absorber and adapted to be connected to a sink for controlling the withdrawal of fluid from the absorber.

22. The combination as defined by claim 21 wherein the flow control means further includes rate control means for controlling the rate of flow through the load and unload valves in accordance with the magnitude of the error signal.

23. The combination as defined by claim 22 wherein the load and unload valves are arranged to open and close completely and wherein the rate control means decreases the duty cycle of the valves as the error signal approaches zero.

24. The combination as defined in claim 23 including a second electrically operated load and unload valve connected to the absorber and adapted to be connected to the source and sink, respectively.

25. The combination as defined in claim 24 wherein the flow control means is arranged to periodically open the first load or unload valves with a duty cycle which is substantially linear with changes in the error signal between first and second predetermined values of error signal and to open the second load or unload valves when the error signal exceeds a third predetermined value of error signal.

26. The combination as defined in claim 21 including means responsive to the speed signal for disabling the flow control means when the rotational speed of the absorber is below a preselected value.

27. In a dynamometer system for imposing a programmed torque on a motor vehicle which simulates operating or normal driving conditions, the combination which comprises;

a hydraulic rotary power absorber arranged to provide an absorbed torque which varies in proportion to the level of working fluid therein and which changes substantially with the square of speed changes with a given level of fill;

a drive roll connected to the absorber for imparting rotary motion thereto;

an idle roll spaced from the drive roll, the drive and idle rolls arranged to support the drive wheels of a motor vehicle therebetween;

a plurality of flywheels;

means for selectively coupling one or more of the flywheels to the drive roll to simulate a selected inertia for the vehicle under test;

speed signal generating means coupled to one of the drive and idle rolls for generating a speed signal representative of the rotational speed of the absorber;

torque signal generating means coupled to the absorber for generating a torque signal representative of the absorbed torque;

squaring means coupled to the speed signal generating means for providing an output signal representative of the square of the speed signal;

power select means having an input connected to the squaring means to receive the squared speed signal and an output and being arranged to provide an output signal which follows a selected torque vs. speed squared curve;

means for comparing the output signal from the power select means with the absorbed torque signal and providing an error signal having a polarity and amplitude representative of the difference between said signals; and flow control means including at least one load valve and one unload valve connected to the absorber and adapted to be connected to a source and sink for the working fluid, respectively, the flow control means being responsive to an error signal of one polarity for opening the load valve and responsive to an error signal of the other polarity to open the unload valve to change the absorbed torque and reduce the error signal.

28. The combination as defined in claim 27 wherein the flow control means varies the duty cycle of the load or unload valve linearly with the changes in the magnitude of the error signal over a predetermined range of magnitude.

29. The combination as defined in claim 28 including means responsive to the speed signal for disabling operation of the flow control means when the speed is below a preselected value.

30. In a system for controlling the retarding force characteristics of a rotary power absorber in which the absorbed torque is increased and decreased, respectively, by operation of load and unload control mechanisms, the combination which comprises:

means for generating a programmed signal representative of the desired absorbed torque or speed of the power absorber, means connected to the power absorber for generating a second signal representative of the actual absorbed torque or speed of the power absorber, comparing means for comparing the programmed signal with the second signal and for generating an error signal representative of the difference therebetween, and pulse modulation control means responsive to the error signal for periodically turning the load or unload control mechanism on and off when the magnitude of the error signal is between first and second predetermined values to reduce the error signal.

31. The combination as defined in claim 30 wherein the pulse modulation means controls the ratio of the on to off time of the control mechanism during each period in proportion to the magnitude of the error signal.

32. The combination as defined in claim 31 wherein the pulse modulation system varies the ratio of the on to off time of the control mechanism linearly with changes in the magnitude of the error signal.

33. The combination as defined in claim 32 wherein the programmed signal is representative of the desired absorbed torque and the second signal is representative of the actual absorbed torque.

34. The combination as defined in claim 33 wherein the error signal is a d.c. signal and the pulse modulation means is responsive to the polarity and magnitude of the error signal for operating the load control mechanism when the error signal is of one polarity and for operating the unload control mechanism when the error signal is of the opposite polarity.

35. The combination as defined in claim 34 wherein the pulse modulation means includes means for adjusting the repetition rate of the on-off periods within a preselected range to accomodate the load-unload characteristics of different absorbers.

36. The combination as defined in claim 34 wherein the absorber is a hydraulic rotary power absorber in which the absorbed torque varies in proportion to the level of fill of working fluid within the absorber and the control mechanisms comprise electrically operated on-off valves connected between the absorber and source and sink for the working fluid to supply or withdraw fluid from the absorber.

37. The combination as defined in claim 32 wherein the programmed signal is representative of the desired speed and the second signal is representative of the actual speed of the absorber.

* * * * *